United States Patent [19]

Hoffman

[11] 4,214,492
[45] Jul. 29, 1980

[54] METHOD AND APPARATUS FOR CUTTING CLIPS OFF OF THE ENDS OF SAUSAGES AND THE LIKE

[76] Inventor: Thomas M. Hoffman, 2147 S. 18th St., Manitowoc, Wis. 54220

[21] Appl. No.: 972,976

[22] Filed: Dec. 26, 1978

[51] Int. Cl.² .................. B26D 5/04; B26D 5/12; B26D 11/00
[52] U.S. Cl. .................. 83/24; 17/1 F; 83/39; 83/98; 83/368; 83/371; 83/517
[58] Field of Search .................. 83/24, 39, 98, 368, 83/371, 370, 516, 598, 517; 17/1 F

[56] References Cited

U.S. PATENT DOCUMENTS

| | | | |
|---|---|---|---|
| 50,481 | 10/1865 | Low | 83/516 |
| 1,745,504 | 2/1930 | Rabinowitz | 83/516 |
| 2,566,966 | 9/1951 | Rockoff | 17/1 F |
| 2,693,233 | 11/1954 | Seidman | 83/371 |
| 3,636,806 | 1/1972 | Vyncke | 83/517 X |
| 3,808,636 | 5/1974 | Gouba | 17/1 F |
| 4,060,875 | 12/1977 | Gosling et al. | 17/1 F |
| 4,085,638 | 4/1978 | Fifer | 83/516 X |

*Primary Examiner*—Frank T. Yost
*Attorney, Agent, or Firm*—William A. Denny

[57] ABSTRACT

A method and apparatus for cutting clamps or clips off of the ends of sausages and similar products formed by forcing material into continuous lengths of an outer tubular casing and placing clips intermediately along the length of the outer casing to separate lengths of the sausage or the like. The clips are removed by positioning the clips of a pair of the sausages or the like adjacent a pair of cutters in such a manner that the cutter jaws are positioned between the adjacent ends of sausages. The cutters are then caused to automatically move apart until they engage the ends of the sausages and are positioned between the respective clips and the ends of the sausages. The cutters are then automatically actuated to cut through the outer casing between the clips and the ends of the sausages to thereby effect removal of the clips and separation of the pair of sausages.

16 Claims, 8 Drawing Figures

METHOD AND APPARATUS FOR CUTTING CLIPS OFF OF THE ENDS OF SAUSAGES AND THE LIKE

BACKGROUND OF THE INVENTION

The invention relates to removal of clips from the ends of sausages and other similar products formed in continuously connected discreet lengths and in a continuous tubular outer skin or casing wherein the discreet lengths are separated by clips constricting the outer casing.

Sausages and other similar products are commonly made by employing automated machinery and wherein a length of thin plastic tubing or casing is filled with sausage to form discreet lengths. The lengths of sausages are established by using metallic or plastic clips to clampingly engage and close off portions of the plastic tubing. During the sausage making process, the sausages thus formed, are conveyed to a smoking chamber. After the smoking has cured or solidified the individual sausages, they have to be separated from each other and the clips removed from the ends of the casings.

In the past, the clips have been removed by manually snipping or cutting off the opposite ends of the sausage casings. Such manual operations are relatively expensive because they are time consuming and labor intensive.

SUMMARY OF THE INVENTION

The invention provides a method and apparatus for removing clips from the ends of sausages and other products having a similar configuration or which are similarly formed. The method and apparatus of the invention employs an automated cutting mechanism to substantially reduce the time and labor required for clip removal operation.

More particularly, the apparatus includes automated means for cutting the clips off of the ends of sausages in a chain of sausages. The apparatus includes a pair of cutters, means for moving the pair of cutters between a first position wherein the cutters are positioned in mutually adjacent relation and a second position wherein the cutters engage the ends of the adjacent sausages and are positioned between the clips and the ends of the sausages. Means are also provided for actuating the moving means to cause the cutters to move from the first position to the second position. Means are further provided for actuating the pair of cutters when the cutters engage the ends of the sausages for thereby causing the cutters to cut through the outer skin at the adjacent ends of the adjacent sausages and for subsequently actuating the moving means for returning the cutters to the first position.

The invention also includes a method for cutting clips off of the ends of sausages of a chain of sausages wherein the sausages have a continuous outer skin and the clips are located at opposite ends of each of the sausages contained in the chain. The method comprises the steps of positioning a pair of cutters and the chain of sausages relative to each other such that the pair of cutters are positioned between the adjacent ends of adjacent sausages in the chain, moving the cutters apart until each cutter engages one of the adjacent ends of the adjacent sausages, and actuating the pair of cutters to cause each of the cutters to cut through the outer skin at the adjacent ends of the adjacent sausages and between the clips and the ends of the sausages.

Various other features and advantages of the invention are set forth in the following description, in the claims and in the drawings.

Figure 1:
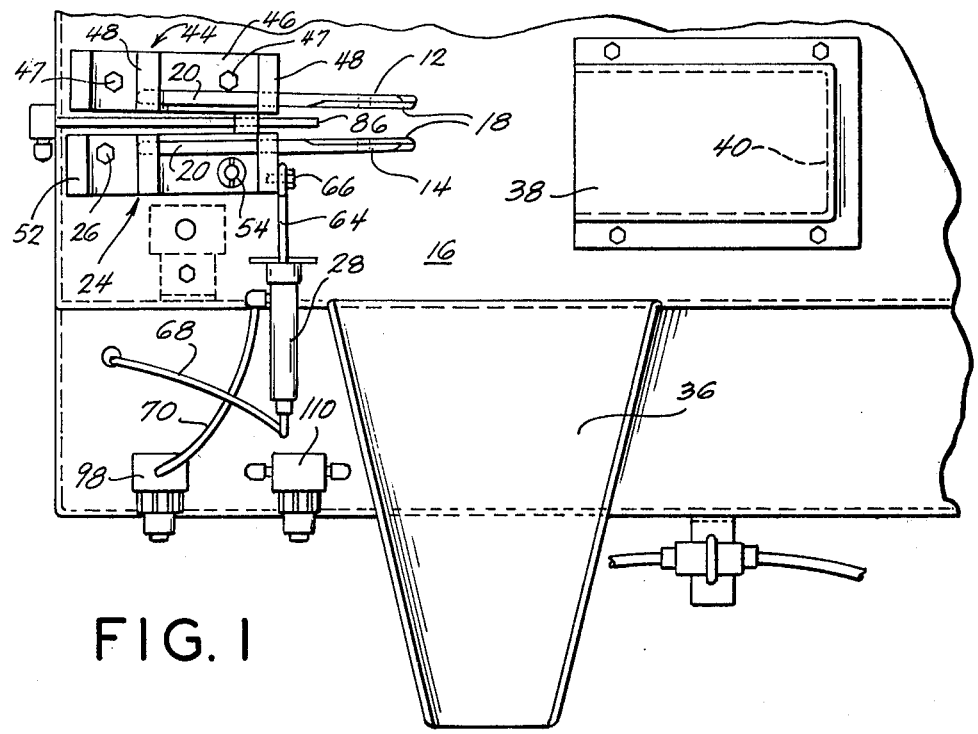
FIG. 1 is a partial plan view of apparatus embodying the invention.

Before describing the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Figure 2:
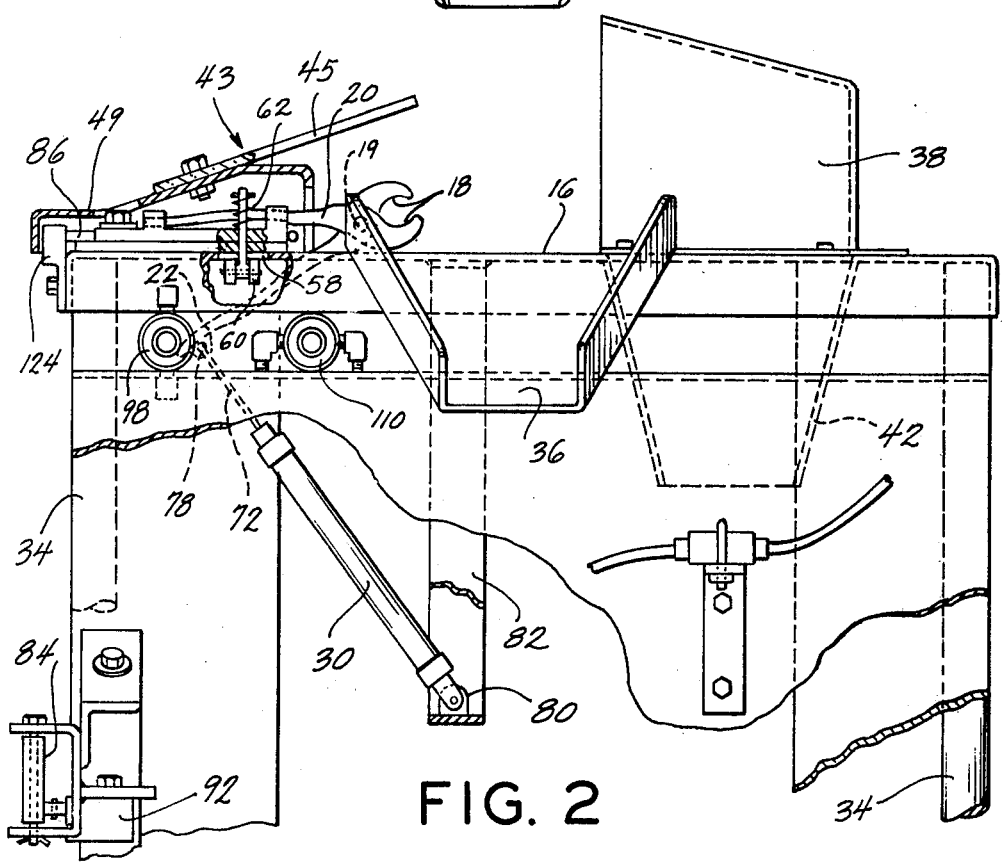
FIG. 2 is an end elevation view of the apparatus shown in FIG. 1.
Figure 3:
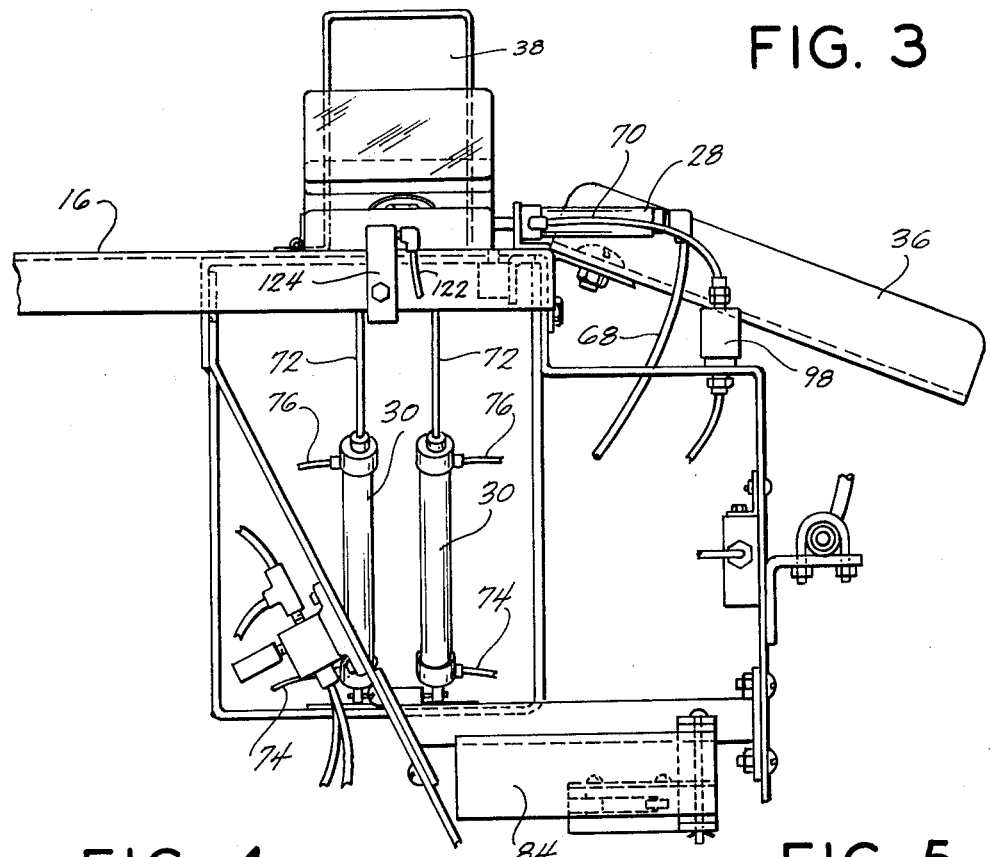
FIG. 3 is a front elevation view of the apparatus shown in FIG. 1.
Figure 4:
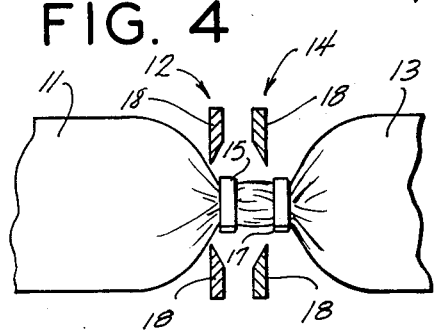
FIG. 4 is a schematic view of the cutters of the apparatus positioned between a pair of adjacent connected sausages.

Illustrated in FIGS. 1 through 3 is an apparatus embodying the present invention. The apparatus illustrated generally includes cutter means shown in the drawings as a pair of clippers 12 and 14 mounted on a supporting table 16. The clippers 12 are mounted on the table 16 and include a set of opposed cutters 18 hingedly joined to pivot about an axis 19, a handle 20 attached to the table 16, and a second handle 22 movable vertically to cause relative movement of the cutters 18 to facilitate cutting.

The other pair of clippers 14 is supported for pivotal movement toward and away from the first set of clippers 12. The clippers 14 similarly include a pair of opposed cutters 18 pivotally connected at a pivot point 19 and a first handle 20 fixed to a pivotal mounting assembly 24. The handle 20 is supported by the pivotal mounting assembly 24 for pivotal movement about the axis of a bolt 26 such that the respective blades 18 of the clippers 12 and 14 are moved toward and away from each other. A pneumatic cylinder 28 is connected to the pivotal mounting assembly 24 to cause such pivotal movement of the mounting assembly 24 and the clippers 14. The movable pair of clippers 14 also includes a movable handle 22, and a pneumatic cylinder 30 is attached to the free end of the handle 22 to cause vertical movement of the handle and consequent cutting movement of the cutters 18.

Figure 5:
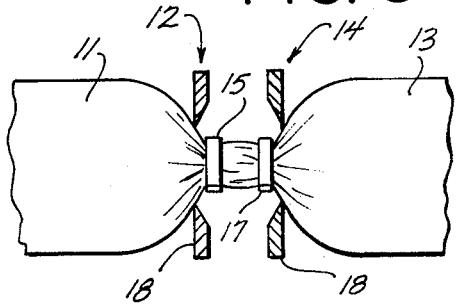
FIG. 5 is a view similar to FIG. 4 but showing the cutters moved apart and engaging the ends of the sausages.
Figure 6:
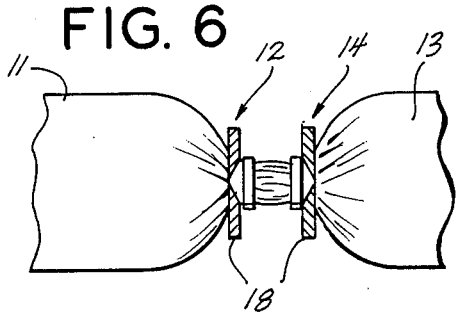
FIG. 6 is a view similar to FIGS. 4 and 5 and showing the cutters cutting through the outer skin of the ends of the sausages to effect removal of the clips.
Figure 7:
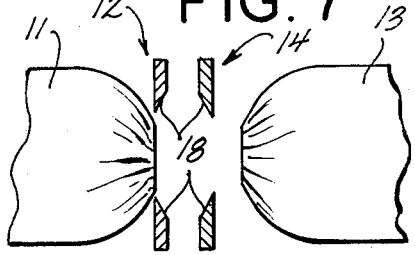
FIG. 7 is a view similar to FIG. 4 and showing the sausages separated following the clip removal step.

Before describing the structure of the apparatus in greater detail, the mode of operation of the apparatus will be briefly described. The mode of operation of the cutters is illustrated schematically in FIGS. 4–7. As shown therein, a pair of adjacent sausages 11 and 13 are manually positioned adjacent the clippers 12 and 14 and such that the cutters 18 of the clippers 12 and 14 are positioned between the opposite ends of the sausages. The cutters 18 are initially in an open position for receiving the material joining the two sausages. The clippers 12 and 14 are then caused to move apart by pivotal movement of the clipper mounting assembly 24 until the cutters 18 of the respective clippers 12 and 14 engage the ends or flanks of the sausages as shown in FIG. 5. In that position the cutters 18 of clippers 12 are positioned between the flank or end of sausage 11 and an adjacent clip 15 and the cutters 18 of the other pair of clippers 14 are positioned between the end of the other sausage 13 and the adjacent clip 17. The pneumatic cylinders 30 attached to the free ends of the movable handles 22 are then actuated to cause closing movement of the cutters 18 of each of the clippers 12 and 14 to thereby cut through the outer skin of the sausages and thereby separate the clips 15 and 17 from the ends of the sausages 11 and 13. As shown in FIGS. 1, 2 and 7, the pneumatic cylinders 30 which effect cutting movement of the cutters 18 are then actuated to cause the cutters 18 to separate and return the clippers 14 to its original position by actuation of the pneumatic cylinder 28.

Referring more specifically to the apparatus embodying the invention, the table 16 includes a planar upper surface 32 supported by legs 34. The table 16 also includes a discharge chute 36 for receiving the sausages after the clips have been removed and for conveying the sausages to a storage bin or the like (not shown). A clip receiving hood 38 is also provided. It projects upwardly from the upper surface 32 of the table 16 and surrounds an apperture 40 therein. The hood 38 functions to receive the clips and the waste sausage casing material cut from the sausage, and facilitates conveyance of that waste material through a chute 42 into a convenient waste receptacle (not shown).

A safety shield assembly 43, including a transparent plastic plate 45, is supported in cantilevered relation by a bracket 49 to extend over the clippers 12 and 14 and provide protection for the operator.

The clippers 12 are supported by a mounting bracket 44 including a plate 46 bolted to the table 16 by a pair of bolts 47. A pair of spaced bracket members 48 extend upwardly from the plate 46 and include aligned appertures therein for receiving the handle 20 of the clippers 12 in such a manner that the handle 20 is secured therein against movement.

The pivotal mounting assembly 24, supporting the clippers 14, includes a mounting bracket 52 having a structure like the mounting bracket 44, but unlike the mounting bracket 44, the mounting bracket 52 is pivotally attached to the table 16 for pivotal movement about the pivot member 26. The bracket 52 is also supported by a pin 54 extending through a bore in the mounting bracket 52 (FIG. 2) and received in an arcuate slot 58 cut in the table 16. The lower end of the pin 54 supports a pair of rollers 60 which engage the lower surface of the table 16. A spring 62 is compressed between the upper end of the pin 54 and the upper surface of the mounting bracket 52 to hold the mounting bracket against the upper surface of the table 16.

The pneumatic cylinder 28, provided for causing arcuate movement of the mounting bracket 52 and consequent movement of the cutters 18 of the clippers 14 toward and away from the cutters of clippers 12, is fixedly attached to the table 16 and includes a projecting piston rod 64. The piston 64 is attached at its free end to the free end of the mounting bracket 52 by a bolt 66. The pneumatic cylinder 28 is a double acting type cylinder, and the piston rod 64 is caused to be extended when air is forced into the cylinder through air line 68 and to be retracted when air is forced into the cylinder through air line 70.

The pneumatic cylinders 30 (FIGS. 2 and 3) are also double acting cylinders and include piston rods 72. The rods 72 are caused to be extended when air is forced into the cylinders 30 through the air lines 74 and are caused to be retracted when air is forced into the cylinders 30 through the respective air lines 76. The free ends of the piston rods 72 are pivotally connected by pins 78 to the free ends of the handles 22 of the respective clippers 12 and 14. In operation of the pneumatic cylinders 30, upward movement of the pistons 72 causes consequent upward movement of the free ends of the handles 22 and cutting movement of the cutting blades 18 of the clippers. Alternatively, retraction of the piston rods 72 causes separation of the cutters 18. As further shown in FIGS. 2 and 3, the lower ends of the cylinders are pivotally attached by a pin 80 to the lower end of the rigid mounting bracket 82 extending downwardly from the table 16.

Operation of the apparatus described above can be initiated by operator engagement of a knee lever 84. That causes air to be first supplied to the pneumatic cylinder 28 through air line 70 to cause retraction of piston 64 and pivotal movement of the clippers 14 away from the fixed clippers 12 until the cutters 18 engage the adjacent ends of the sausages 11 and 13, as shown in FIG. 5. At that point, air pressure builds up in the pneumatic cylinder 28. Means are provided for sensing such a pressure increase and for then causing air flow to the two pneumatic cylinders 30 through the air lines 74 whereby the piston rods 72 are caused to actuate the cutters 18 for cutting through the outer casing material to remove the clips 15 and 17 and the casing material therebetween. Air is also supplied to a hollow tube 86 (FIG. 1) positioned between the clippers 12 and 14 so as to blow the waste casing material and the clips 15 and 17 into the hood 38 and thence to a waste receptacle.

Means are further provided for then causing venting of the pneumatic cylinders 30 through the air lines 74 when the knee lever 84 is released, and for supply of air through the air lines 76 to the pneumatic cylinders 30 to cause retraction of the pistons 72 and separation of the cutters 18. Air is also supplied through the air line 68 to the cylinder 28 to cause extension of the piston 64 and movement of the clippers 14 toward the clippers 12. When air is supplied through the air line 68 to the cylinder 28, air is vented through air line 70.

Figure 8:
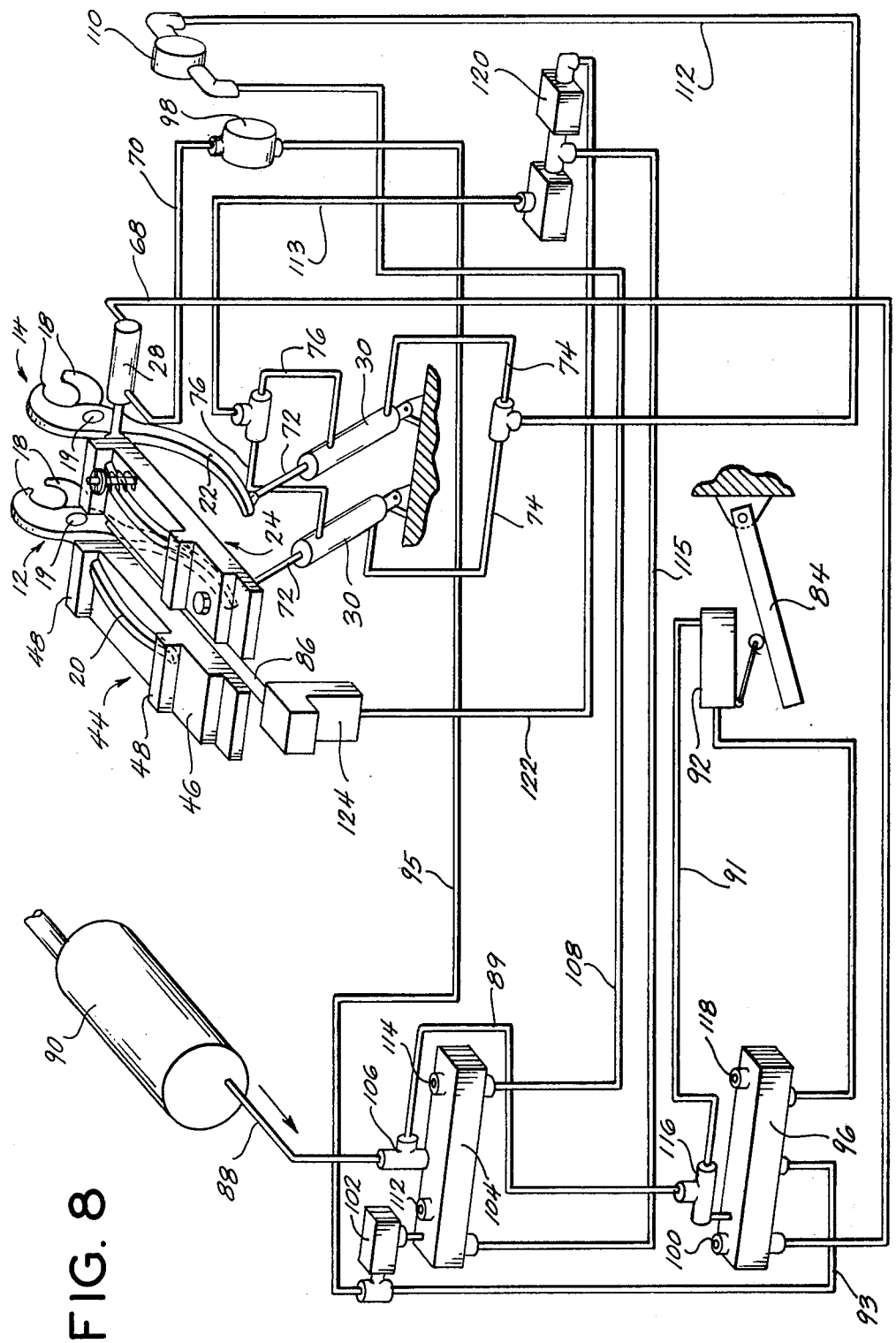
FIG. 8 is a schematic view of the cutter assembly for the apparatus and its associated actuating system.

The means for providing the air flow as described above is illustrated schematically in FIG. 8. As shown therein, air is conveyed through air lines 88, 89 and 91 from an air supply 90 to a valve 92. While various valves can be provided, in the preferred embodiment of the invention the valve 92 is a roller lever actuated valve type LSC-3200-LL41 manufactured by Versa Products Company, Inc., Englewood, New Jersey. The valve 92 is controlled by operation of the knee lever 84 such that when the knee lever 84 is depressed the valve 92 permits air flow from the conduits 88, 89 and 91 through the valve 92 and through a conduit 94 to a four-way valve 96. The fourway valve 96 can be a Series "V" four-way valve produced by Versa Products Co., Inc. Air is conveyed from the valve 96 through the air lines 93 and 95 and through an air flow regulator 98 to air line 70 and the pneumatic cylinder 28. As previously stated, such air flow through the air line 70 to the pneumatic cylinder 28 causes retraction of the piston 64 and movement of the clippers 14 away from the clippers 12 to the position shown schematically in FIG. 5.

When air is conveyed through the air line 70 into the pneumatic cylinder 28 air is exhausted through conduit 68 to the valve 96 and through an exhaust port 100 in the valve 96. When the piston 64 is fully retracted, the air pressure increases in the pneumatic cylinder 28. Such an increase in air pressure is sensed by a pressure sensing valve 102 attached as a pilot valve to a four-way valve 104. In the preferred embodiment the valve 104 can be a valve identical to valve 96, but also including a Pilot Cap Assembly manufactured by Versa Products Co., Inc. and functioning as the pressure sensing valve.

The air supply line 88 from the supply 90 is also connected through a coupling 106 to the valve 104. In response to a predetermined pressure increase in the pneumatic cylinder 28 and in the air line 70, the pressure sensing valve 102 can effect movement of the spool of the four-way valve 104 to thereby cause air flow from the supply line 88 through air line 108, through an air flow regulator 110 and through air line 112 to the air lines 74 connected to the pneumatic cylinders 30. The pneumatic cylinders 30 will thus cause movement of the cutters 18 of the clippers 12 and 14 to the position shown in FIG. 6. When air is conveyed through the air lines 74 to the pneumatic cylinders 30, the air in the cylinders 30 is vented through air lines 76, 113 and 115 and through the exhaust port 112 of the four-way valve 104.

When the knee lever 84 is then released, air flow through the valve 92 is halted and the spools of the valves 96 and 104, which are spring biased, return to their original position. Air is then conveyed from the air supply line 88 through the air conduits 115, 113 and 76 to cause retraction of the pistons 72 whereby the cutters 18 are separated. Air is simultaneously vented from the cylinders 30 through air lines 74, 112, 108 and exhaust ports 114. Air is also conveyed from air line 89 to a coupling 116 and air line 118. Air then flows from line 118 through the valve 96 and through the air line 68 to the pneumatic cylinder 28 to cause clippers 12 and 14 to move to their original position as shown in FIG. 7. Air is simultaneously exhausted from cylinder 28 through air lines 70, 95 and 93 and through exhaust port 118 of valve 96. As the air is conveyed from the valve 104 to the air lines 76, air is also conveyed through a one shot valve 120 and through an air line 122 and coupling 124 to the tube 86 to thereby cause an air blast to blow the cut off clips and the waste material into the hood 38.

Various features of the invention are now set forth in the following claims.

I claim:

1. An apparatus for cutting clips off of the ends of adjacent pairs of sausages or the like, the clips being located between adjacent sausage ends, said apparatus comprising a pair of clippers having cutters, means for permitting relative movement of said pair of clippers between a first position wherein the cutters of said clippers are positioned in mutually adjacent relation and a second position wherein said cutters engage the ends of the adjacent sausages and are positioned between said clips and said ends, means for actuating said clipper moving means to cause said cutters to move from said first position to said second position, and means for automatically actuating said pair of clippers when said cutters engage said ends and causing said cutters to cut through the outer skin at the adjacent ends of the sausages to effect removal of the clip or clips therebetween.

2. Apparatus in accordance with claim 1 wherein means are further provided for automatically ejecting from between the cutters the clips and the cut outer skin which extended between the adjacent ends of the adjacent sausages or the like.

3. An apparatus in accordance with claim 1 wherein said moving means comprises first fluid motor means connected to one of said clippers and wherein said clipper actuating means comprises second fluid motor means connected to said clippers, and further including a switch and fluid regulator means for effecting fluid flow to said first fluid motor so that said clippers are relatively moved from the first position, when said switch is displaced by an operator, until the cutters of said clippers engage ends of the adjacent sausages, and thereafter, for effecting fluid flow to said second fluid motor means so that said cutters cut through the outer skin of the adjacent ends of the adjacent sausages.

4. An apparauts in accordance with claim 3 further including fluid pressure supply means connected to said fluid regulator means, and wherein said fluid regulator means includes means for automatically supplying fluid to said second fluid motor means when the pressure in said first fluid motor means exceeds a predetermined limit.

5. An apparatus in accordance with claim 4 further comprising a table top and clipper holder means for pivotally mounting one of said pair of clippers to said table top and for supporting said pair of clippers for pivotal movement from said first position to said second position.

6. An apparatus in accordance with claim 5 wherein each of said pair of clippers includes a first cutter and handle portion fixed to said clipper holding means, and a second cutter and handle portion pivotally secured to said first cutter and handle portion, and wherein said second fluid motor means is connected to said second handle and cutter portion of each of said clippers.

7. A method for cutting clips off the ends of sausages of a chain of sausages, the sausages of the chain having a continuous outer skin, and the clips being located between ends of adjacent sausage contained in the chain, the method comprising the steps of: positioning a pair of cutters and the chain of sausages relative to each other so that the pair of cutters are positioned between the adjacent ends of adjacent sausages in the chain, moving the cutters apart until each cutter engages one of the adjacent ends of the adjacent sausages, and actuating the pair of cutters to cause each of said cutters to cut through the outer skin at the adjacent ends of the adjacent sausages between the clips and the ends of the sausages.

8. A method in accordance with claim 7 further comprising the step of removing the clips and the portion of the cut outer skin extending between the adjacent ends of the adjacent sausages.

9. Apparatus for cutting clips off the adjacent ends of adjacent portions of material contained in a continuous outer skin and forming a chain of such portions of material, the clips closing the continuous outer skin and being located at opposite ends of each portion contained in the chain, said apparatus comprising a pair of cutters, means for moving said pair of cutters away from a first position until each cutter engages one of the adjacent ends of the adjacent portions, and means for actuating said pair of cutters so that the cutters cut through the outer skin at the adjacent ends of the adjacent portions.

10. Apparatus in accordance with claim 9 further comprising means for removing the clips and the cut outer skin extending between the adjacent ends of the adjacent portions.

11. An apparatus in accordance with claim 9 wherein said moving means comprises first fluid motor means connected to one of said pair of cutters, wherein said closing means comprises second fluid motor means connected to each of said cutters, and said apparatus further comprises a switch and fluid regulator means for regulating fluid flow to said first fluid motor so that said pair of cutters are moved apart from the first position when said switch is displayed by an operator until each of said cutters engages one of the adjacent ends of the adjacent sausages, and thereafter, for regulating fluid flow to said second fluid motor means so that said cutters cut through the outer skin of the adjacent ends of the adjacent sausages.

12. An apparatus in accordance with claim 11 further comprising fluid pressure supply means conneced to said fluid regulator means, and wherein said fluid regulator means is operative for supplying fluid to said second fluid motor means when the pressure in said first fluid motor means exceeds a predetermined limit.

13. An apparatus in accordance with claim 9 further comprising a table top and cutter holder means for movably mounting said cutters on said table top for allowing movement of said pair of cutters apart from said first position until each pair of cutters engages one of the adjacent ends of the adjacent portions.

14. An apparatus in accordance with claim 13 wherein each of said pair of cutters comprises a first cutting portion and handle portion secured to said cutters holding means, and a second cutting portion and handle portion pivotally secured to said first portion, and wherein said second fluid motor means is connected to said second handle and cutting portion of each of said cutters.

15. A method for cutting clips off the adjacent ends of separate portions of material contained in a continuous outer skin defining a chain of such separate portions, the clips closing the continuous outer skin and being located at opposite ends of each separate portion contained in the chain, said method comprising the steps of: moving a pair of cutters and the chain separate portions relative to each other so that the pair of cutters extends between the adjacent ends of adjacent separate portions in the chain, moving the pair of cutters apart until each pair of cutters engages one of the adjacent ends of the adjacent separate portions, and actuating the pairs of cutters to close and cut through the outer skin at the adjacent ends of the adjacent separate portions.

16. A method in accordance with claim 15 and further including the step of removing the clips and waste portion of the cut outer skin extending between the adjacent ends of the adjacent separate portion.

* * * * *

UNITED STATES PATENT AND TRADEMARK OFFICE
CERTIFICATE OF CORRECTION

PATENT NO. : 4,214,492
DATED : Jul. 29, 1980
INVENTOR(S) : Thomas M. Hoffman

It is certified that error appears in the above-identified patent and that said Letters Patent are hereby corrected as shown below:

Column 4, line 68, "fourway" should be --four-way---.

Column 6, line 26, "apparauts" should be --apparatus---.

Column 7, line 26, "conneced" should be --connected--.

Column 8, line 20, "chain separate" should be --chain of separate--.

*Signed and Sealed this*

*Twenty-eighth* Day of *October 1980*

[SEAL]

*Attest:*

SIDNEY A. DIAMOND

*Attesting Officer*  *Commissioner of Patents and Trademarks*